US009764529B2

(12) United States Patent
Allen et al.

(10) Patent No.: US 9,764,529 B2
(45) Date of Patent: Sep. 19, 2017

(54) COMPOSITE ARTICLES AND METHODS OF PRODUCING SAME

(75) Inventors: Warrick James David Allen, Tewkesbury (GB); James Leonard Rolfe, Tewkesbury (GB); Nicholas Horrocks, Tewkesbury (GB); Paul Edward Young Milne, Tewkesbury (GB)

(73) Assignee: SYNTOR FINE CHEMICALS LIMITED, Manchester (GB)

( * ) Notice: Subject to any disclaimer, the term of this patent is extended or adjusted under 35 U.S.C. 154(b) by 856 days.

(21) Appl. No.: 13/814,183

(22) PCT Filed: Aug. 2, 2011
(Under 37 CFR 1.47)

(86) PCT No.: PCT/GB2011/051463
§ 371 (c)(1),
(2), (4) Date: May 7, 2014

(87) PCT Pub. No.: WO2012/017237
PCT Pub. Date: Feb. 9, 2012

(65) Prior Publication Data
US 2015/0283784 A1    Oct. 8, 2015

(30) Foreign Application Priority Data

Aug. 2, 2010 (GB) .................. 1012948.4
Oct. 4, 2010 (GB) .................. 1016644.5
May 16, 2011 (GB) .................. 1108110.6

(51) Int. Cl.
| | | |
|---|---|---|
| B32B 1/08 | (2006.01) |
| B32B 7/12 | (2006.01) |
| B32B 27/12 | (2006.01) |
| F16L 11/04 | (2006.01) |
| B32B 25/10 | (2006.01) |
| B32B 37/12 | (2006.01) |
| B32B 37/14 | (2006.01) |
| F16L 11/02 | (2006.01) |
| B32B 5/08 | (2006.01) |
| B32B 27/38 | (2006.01) |
| C09D 139/02 | (2006.01) |
| D06M 10/10 | (2006.01) |
| D06M 15/356 | (2006.01) |
| B32B 25/20 | (2006.01) |

(52) U.S. Cl.
CPC .................. *B32B 1/08* (2013.01); *B32B 5/08* (2013.01); *B32B 7/12* (2013.01); *B32B 25/10* (2013.01); *B32B 25/20* (2013.01); *B32B 27/12* (2013.01); *B32B 27/38* (2013.01); *B32B 37/1207* (2013.01); *B32B 37/142* (2013.01);
(Continued)

(58) Field of Classification Search
CPC  B32B 1/08; B32B 25/10; B32B 25/20; B32B 27/12; B32B 27/38; B32B 37/1207; B32B 37/142; B32B 5/08; B32B 7/12; B32B 2255/02; B32B 2255/26; B32B 2262/0269; B32B 2262/0276; C09D 139/02; D06M 10/10; D06M 15/3562; F16L 11/02; F16L 11/04
USPC .................................................. 526/304
See application file for complete search history.

(56) References Cited

U.S. PATENT DOCUMENTS

| | | | |
|---|---|---|---|
| 4,530,874 A | 7/1985 | Hendrix et al. | |
| 6,559,261 B1 * | 5/2003 | Milne ............... | C07C 69/50 526/279 |
| 2003/0054141 A1 | 3/2003 | Worley et al. | |

FOREIGN PATENT DOCUMENTS

WO    WO 9428053 A1 * 12/1994 ............. C08G 77/38

OTHER PUBLICATIONS

Non-Final Office Action on U.S. Appl. No. 13/814,177 dated Apr. 13, 2017.

* cited by examiner

*Primary Examiner* — Ling Choi
*Assistant Examiner* — Chun-Cheng Wang
(74) *Attorney, Agent, or Firm* — Foley & Lardner LLP

(57) ABSTRACT

According to the invention there is provided a composite article including: a textile layer having a first and a second face, each of the first and second faces having a polymeric coating thereon; a first polymeric layer adhered to the polymeric coating on the first face of the textile layer; and a second polymeric layer adhered to the polymeric coating on the second face of the textile layer; in which the polymeric coatings on the first and second faces of the textile layer are each formed by polymerizing a polymeric precursor which includes a group of sub-formula (I) where $R^2$ and $R^3$ are independently selected from $(CR^7R^8)n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either One of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents, $R^1$ is selected from hydrogen, halo, nitro, hydrocarbyl, optionally substituted or interposed with functional groups, or formula (II), and $R^{13}$ is C(0) or $S(0)_2$.

23 Claims, 1 Drawing Sheet

(52) U.S. Cl.
CPC .......... *C09D 139/02* (2013.01); *D06M 10/10* (2013.01); *D06M 15/3562* (2013.01); *F16L 11/02* (2013.01); *F16L 11/04* (2013.01); *B32B 2255/02* (2013.01); *B32B 2255/26* (2013.01); *B32B 2262/0269* (2013.01); *B32B 2262/0276* (2013.01); *B32B 2262/103* (2013.01); *B32B 2262/14* (2013.01); *B32B 2310/0831* (2013.01); *B32B 2383/00* (2013.01); *B32B 2398/00* (2013.01); *B32B 2597/00* (2013.01); *Y10T 428/249921* (2015.04)

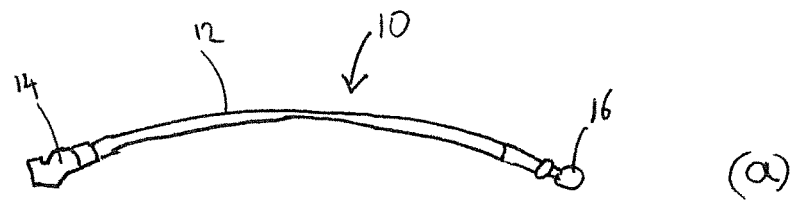
(a)
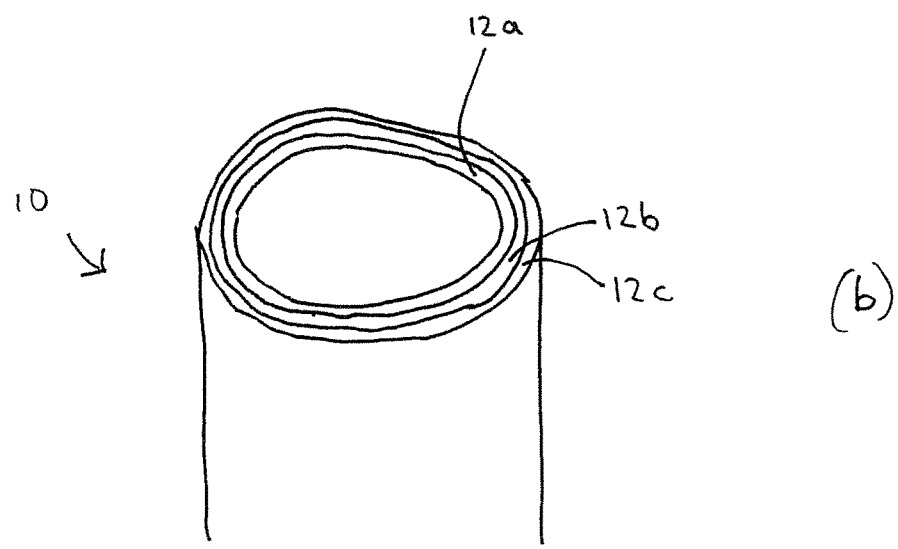
(b)
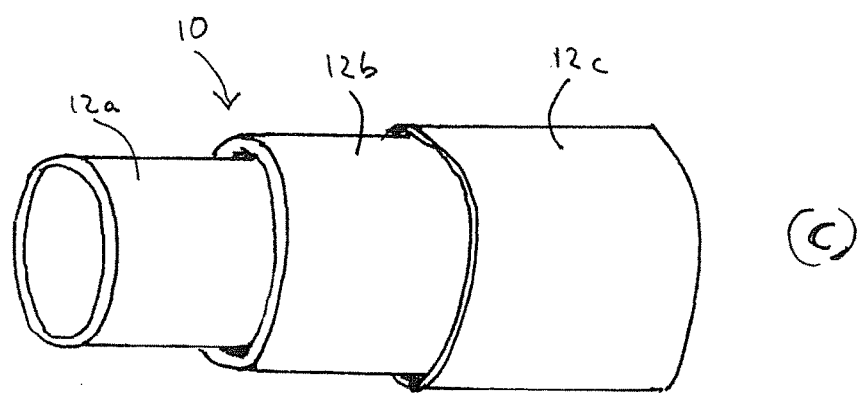
(c)

COMPOSITE ARTICLES AND METHODS OF PRODUCING SAME

CROSS-REFERENCE TO RELATED APPLICATIONS

This application represents the national stage entry of PCT International Application No. PCT/GB2011/051463 filed on Aug. 2, 2011 and claims the benefit of Great Britain Patent Applications No. 1012948.4 filed Aug. 2, 2010, and 1016644.5 filed Oct. 4, 2010, and 108110.6 filed May 16, 2011. The contents of all of these applications are hereby incorporated by reference as if set forth in their entirety herein.

This invention relates to composite articles and methods of producing same, with particular reference to composite articles of the type having a textile layer with a first and second face, with a first polymeric layer adhered to the first face and a second polymeric layer adhered to the second face.

There are numerous applications for composite articles formed from textile reinforced rubber or other elastomer. At the heart of these composite articles is a "sandwich" formed by a textile layer (the "inclusion material") interposed between two layers of a rubber (the "host material"). Composite articles of this general type can be provided in many forms, and physically, the textile layer may be completely contained within a rubber matrix. Tubular composite articles are commonly used as hoses in the automotive industry. Belt structures can be provided, for example for use as power transmission belts or conveyor belts. Other composite articles such as high performance tyres and air cushions may be provided.

An important consideration in the manufacture of composite articles of the above described type is the strength of the inter-layer adhesion between the textile layer and the rubber layers. Rubbers are difficult to adhere to owing to their typically low surface energy. Typically, the reinforcing textile layer is pre-treated with silane or RFL (resorcinol formaldehyde latex) adhesion promoters. However, there are disadvantages associated with this approach, both in terms of the strength of the resulting adhesion and the environmental effects of these chemicals. Silane is a particularly hazardous chemical to use, and RFL requires the installation of filtering equipment to overcome its environmental effects, which is costly and time-consuming.

Furthermore, in many applications, such as high quality automotive hoses, it is desirable to use polyaramid (hereinafter termed "aramid") based textiles as a reinforcing layer, in particular premium quality flame retardant aramids such as Nomex®, Conex®, and Twaron®. This enables the provision of hoses which can withstand higher temperatures and load forces, which would otherwise cause distortion or possibly service failure. However, it is particularly difficult to obtain acceptable adhesion on aramid fibres, and the provision of a composite article which includes a low surface energy rubber adhered to an aramid fabric is very challenging.

The present invention, in at least some of its embodiments, addresses the above named problems and desires. The present invention enables composite articles to be formed through the adhesion of rubber layers onto an aramid textile layer. However, the invention is not limited in this regard and, for example, it is possible to utilise textile layers formed from materials other than aramids, and it is possible to utilise polymeric host materials other than elastomers.

According to a first aspect of the invention there is provided a composite article including:

a textile layer having a first and a second face, each of the first and second faces having a polymeric coating thereon;

a first polymeric layer adhered to the polymeric coating on the first face of the textile layer; and a second polymeric layer adhered to the polymeric coating on the second face of the textile layer;

in which the polymeric coatings on the first and second faces of the textile layer are each formed by polymerising a polymeric precursor which includes a group of sub-formula (I)

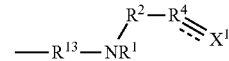

where $R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents, $R^1$ is selected from hydrogen, halo, nitro, hydrocarbyl, optionally substituted or interposed with functional groups, or

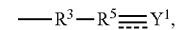

and $R^{13}$ is C(O) or $S(O)_2$.

The polymeric precursors provided by the invention are preferably utilised with little or no solvents or other VOCs, and hence minimise the environmental impact of the invention. It is possible to achieve excellent adhesion between textile layers and a range of polymeric layers.

For the avoidance of doubt, the term 'polymeric precursor' includes reference to monomers, and also to pre-polymers obtained by partial or pre-polymerisation of one or more monomers.

Advantageously, the first and second polymeric layers are elastomeric layers.

Without wishing to be bound by any particular theory, it is believed that at least part of the problem associated with bonding to low surface energy elastomeric substrates lies in the initial requirement of a contacting layer to have a surface tension lower than that of the surface energy of the substrate. Polymeric coatings can be produced by the polymerisation of compounds of Formula (I) which are sufficiently hydrophobic in nature or otherwise suitable to adhere to a low surface energy elastomeric substrate, but nevertheless the corresponding polymeric precursor is able to activate the double bond or bonds sufficiently for polymerisation to be able to occur. Furthermore, the polymeric coatings of the invention can adhere to textiles such as aramids.

In a preferred embodiment, the composite article is a hose, in which the textile layer and the first and second elastomeric layers are cylindrical, and wherein the first elastomeric layer is external to the textile layer and the second elastomeric layer is internal to the textile layer. Hoses of this type can be used for a variety of purposes, such as in automotive applications, eg, as exhaust mufflers and turbocharger hoses.

In other preferred embodiments, the composite article is a belt, a tyre or an air cushion. A belt may be in the form of an endless belt, preferably a conveyor belt or a power transmission belt.

For the avoidance of doubt, the terms "elastomer" and "elastomeric layer" include reference to natural and synthetic rubbers, and to thermoplastic elastomers. Preferably, at least one of the first and second elastomeric layers is a rubber, most preferably a vulcanized rubber. Textile layers may be adhered to various elastomers which have traditionally been difficult to adhere to. Accordingly, at least one of the first and second elastomeric layers may be a silicone rubber, a fluoro-silicone rubber, a fluorocarbon rubber, an ethylene propylene rubber (EPDM), a polypropylene rubber or a hydrogenated nitrile rubber. Further alternatives include styrene butadiene rubber (SBR) and nitrile butadiene rubber (NBR).

The first elastomeric layer may be formed from a different material to the second elastomeric layer. In one embodiment, the composite article is a hose in which the first elastomeric layer is formed from a silicone rubber and the second elastomeric layer is formed from an oil-resistant rubber such as a fluoro-silicone rubber. Other combinations would suggest themselves to the skilled reader.

Alternatively, the first elastomeric layer may be formed from the same material to the second elastomeric layer.

The first and second polymeric layers may be formed from polymeric materials other than elastomers. For example, the first and second polymeric layers may be formed from a thermosetting polymer, such as a thermosetting epoxy resin or a polyurethane. Alternatively, the first and second polymeric layers may be formed from a thermoplastic material such as a thermoplastic polyolefin. In some embodiments, the first and second polymeric layers are formed from a low surface energy material, although the invention is not limited in this regard. Embodiments in which the first and second polymeric layers are a thermosetting epoxy resin are examples of embodiments in which the polymeric material is not of a low surface energy. It is advantageous that the polymeric coatings provided by the invention are able to adhere successfully to both low surface energy and non-low surface energy materials.

The textile layer may be formed from fibres, ribbons or lamellae of a wide variety of materials. In some embodiments, the textile layer is formed at least partially from polymeric fibres, which fibres may be synthetic fibres. Preferably, the textile layer contains aramid or polyester fibres. It is highly advantageous that aramid textile layers can be successfully incorporated into composite articles using the invention, because it has traditionally been difficult to bond to aramids. Also, high quality composite articles having excellent performance characteristics can be produced. The textile layer may consist entirely of aramid fibres, or may comprise a mixture of aramid fibres and fibres of at least one other kind. The aramid fibres may be meta-aramid fibres and/or para-aramid fibres. Examples of suitable aramid fibres are Nomex®, Conex®, Kevlar®, Kermel® and Twaron®.

The use of natural fibres in the textile layer is also within the scope of the invention.

The textile layer may comprise plain, uncoloured textile fibres, or pre-coloured textile fibres.

In some embodiments, the textile layer is formed at least partially from a metal. The term "metal" is understood to include alloys. The metal may be steel or a shape memory alloy. For example, steel ribbon might be used. The textile layer may consist entirely of a metal structure, or the textile layer may be metal containing, such as a weave or other fabric layer which incorporates a metal fibre or filament component and a non-metal component such as a polymeric fibre.

Typically, the polymeric coatings on the first and second faces of the textile layer are formed by polymerising a common polymeric precursor. However, in principle it is possible to use different polymeric precursors to form different polymeric coatings on the first and second faces of the textile layer.

The composite article may include one or more further layers. In other words, the invention is not limited to three-ply structures. For example, some composite articles may be provided with two outer layers, each of which is adhered to a polymeric layer. Any further layers may be adhered to a polymeric layer via a polymeric coating of the type described herein or by another adhesive. The further layers may be further textile layers, or other kinds of layers, for example metal layers.

According to a second aspect of the invention there is provided a method of producing a composite article including the steps of:

providing a textile layer having a first and second face;

providing at least one polymeric precursor which includes a group of sub-Formula (I)

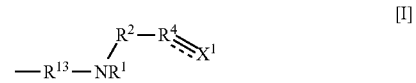

[I]

where $R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents, R$^1$ is selected from hydrogen, halo, nitro, hydrocarbyl, optionally substituted or interposed with functional groups, or

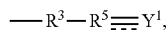

and

R$^{13}$ is C(O) or S(O)$_2$;

polymerising the polymeric precursor or precursors to form a polymeric coating on each of the first and second faces of the textile layer;

adhering a first polymeric layer to the polymeric coating on the first face of the textile layer; and adhering a second polymeric layer to the polymeric coating on the second face of the textile layer.

International Publications WO 00/06610, WO 00/06533, WO 00/06658, WO 01/36510, WO 01/40874, WO 01/74919, WO 2007/012860, WO 2008/001102, and WO 2009/063211, the contents of all of which are herein incorporated by reference, disclose a general class of polymers obtained from the polymerisation of a number of compounds which possess one or more dienyl groups. The Applicant's co-pending UK patent applications no.s 1012954.2 and 1016664.3 provide further details concerning the synthesis and polymerisation of some examples of the classes of monomers described herein.

Preferably, the polymeric precursor or precursors are polymerised by exposure to ultraviolet radiation. Alternative polymerisation methods include the application of heat (which may be in the form of IR radiation), where necessary in the presence of an initiator, by the application of other sorts of initiator such as chemical initiators, or by initiation using an electron beam. The expression "chemical initiator" as used herein refers to compounds which can initiate polymerisation such as free radical initiators and ion initiators such as cationic or anionic initiators as are understood in the art. In the preferred embodiments in which the monomer is polymerised by exposure to ultraviolet radiation, polymerisation may take place either spontaneously or in the presence of a suitable initiator. Examples of suitable initiators include 2,2'-azobisisobutyronitrile (AIBN), aromatic ketones such as benzophenones in particular acetophenone; chlorinated acetophenones such as di- or tri-chloracetophenone; dialkoxyacetophenones such as dimethoxyacetophenones (sold under the trade name "Irgacure 651") dialkylhydroxyacetophenones such as dimethylhydroxyacetophenone (sold under the trade name "Darocure 1173"); substituted dialkylhydroxyacetophenone alkyl ethers such compounds of formula

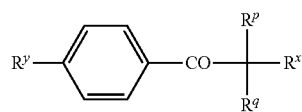

where R$^y$ is alkyl and in particular 2,2-dimethylethyl, R$^x$ is hydroxyl or halogen such as chloro, and R$^p$ and R$^q$ are independently selected from alkyl or halogen such as chloro (examples of which are sold under the trade names "Darocure 1116" and "Trigonal P1"); 1-benzoylcyclohexanol-2 (sold under the trade name "Irgacure 184"); benzoin or derivatives such as benzoin acetate, benzoin alkyl ethers in particular benzoin butyl ether, dialkoxybenzoins such as dimethoxybenzoin or deoxybenzoin; dibenzyl ketone; acyloxime esters such as methyl or ethyl esters of acyloxime (sold under the trade name "Quantaqure PDO"); acylphosphine oxides, acylphosphonates such as dialkylacylphosphonate, ketosulphides for example of formula

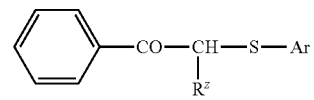

where R$^z$ is alkyl and Ar is an aryl group; dibenzoyl disulphides such as 4,4'-dialkylbenzoyldisulphide; diphenyldithiocarbonate; benzophenone; 4,4'-bis(N,N-dialkyamino) benzophenone; fluorenone; thioxanthone; benzil; or a compound of formula

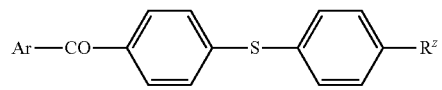

where Ar is an aryl group such as phenyl and R$^z$ is alkyl such as methyl (sold under the trade name "Speedcure BMDS"), or an initiator of the type sold under the trade name 'Irgacure 127'.

As used herein, the term "alkyl" refers to straight or branched chain alkyl groups, suitably containing up to 20 and preferably up to 6 carbon atoms. The terms "alkenyl" and "alkynyl" refer to unsaturated straight or branched chains which include for example from 2-20 carbon atoms, for example from 2 to 6 carbon atoms. Chains may include one or more double to triple bonds respectively. In addition, the term "aryl" refers to aromatic groups such as phenyl or naphthyl.

The term "hydrocarbyl" refers to any structure comprising carbon and hydrogen atoms. For example, these may be alkyl, alkenyl, alkynyl, aryl such as phenyl or napthyl, arylalkyl, cycloalkyl, cycloalkenyl or cycloalkynyl. Suitably they will contain up to 20 and preferably up to 10 carbon atoms. The term "heterocylyl" includes aromatic or non-aromatic rings, for example containing from 4 to 20, suitably from 5 to 10 ring atoms, at least one of which is a heteroatom such as oxygen, sulphur or nitrogen. Examples of such groups include furyl, thienyl, pyrrolyl, pyrrolidinyl, imidazolyl, triazolyl, thiazolyl, tetrazolyl, oxazolyl, isoxazolyl, pyrazolyl, pyridyl, pyrimidinyl, pyrazinyl, pyridazinyl, triazinyl, quinolinyl, isoquinolinyl, quinoxalinyl, benzthiazolyl, benzoxazolyl, benzothienyl or benzofuryl.

The term "functional group" refers to reactive groups such as halo, cyano, nitro, oxo, C(O)$_n$R$^a$, OR$^a$, S(O)$_t$R$^a$, NR$^b$R$^c$, OC(O)NR$^b$R$^c$, C(O)NR$^b$R$^c$, OC(O) NR$^b$R$^c$, —NR$^7$C(O)$_n$R$^6$, —NR$^a$CONR$^b$R$^c$, —C=NOR$^a$, —N=CR$^b$R$^c$, S(O)$_t$NR$^b$R$^c$, C(S)$_n$R$^a$, C(S)OR$^a$, C(S)NR$^b$R$^c$ or —NR$^b$S(O)$_t$R$^a$ where R$^a$, R$^b$ and R$^c$ are independently selected from hydrogen or optionally substituted hydrocarbyl, or R$^b$ and R$^c$ together form an optionally substituted ring which optionally contains further heteroatoms such as S(O)$_s$, oxygen and nitrogen, n is an integer of 1 or 2, t is 0 or an integer of 1-3. In particular, the functional groups are groups such as halo, cyano, nitro, oxo, C(O)$_n$R$^a$, OR$^a$, S(O)$_t$R$^a$, NR$^b$R$^c$, OC(O)NR$^b$R$^c$, C(O)NR$^b$R$^c$, OC(O)NR$^b$R$^c$, —NR$^7$C(O)$_n$R$^6$, —NR$^a$CONR$^b$R$^c$, —NR$^a$CSNR$^b$R$^c$, C=NOR$^a$, —N=CR$^b$R$^c$, S(O)$_t$NR$^b$R$^c$, or —NR$^b$S(O)$_t$R$^a$ where R$^a$, R$^b$ and R$^c$, n and t are as defined above.

The term "heteroatom" as used herein refers to non-carbon atoms such as oxygen, nitrogen or sulphur atoms. Where the nitrogen atoms are present, they will generally be present as part of an amino residue so that they will be substituted for example by hydrogen or alkyl.

The term "amide" is generally understood to refer to a group of formula C(O)NR$^a$R$^b$ where R$^a$ and R$^b$ are hydrogen or an optionally substituted hydrocarbyl group. Similarly, the term "sulphonamide" will refer to a group of formula S(O)$_2$NR$^a$R$^b$. Suitable groups R$^a$ include hydrogen or methyl, in particular hydrogen.

The nature of any electron withdrawing group or groups additional to the amine moiety used in any particular case will depend upon its position in relation to the double bond it is required to activate, as well as the nature of any other functional groups within the compound. The term "electron withdrawing group" includes within its scope atomic substituents such as halo, e.g. fluro, chloro and bromo, and also molecular substituents such as nitrile, trifluoromethyl, acyl such as acetyl, nitro, or carbonyl.

Where R$^{11}$ is an electron withdrawing group, it is suitably acyl such as acetyl, nitrile or nitro.

Preferably, R$^7$ and R$^8$ are independently selected from fluoro, chloro or alkyl or H. In the case of alkyl, methyl is most preferred.

Preferably, X$^2$, X$^3$, Y$^2$ and Y$^3$ are all hydrogen.

Alternatively, it is possible that at least one, and possibly all, of X$^2$, X$^3$, Y$^2$ and Y$^3$ is a substituent other than hydrogen or fluorine, in which instance it is preferred that at least one, and possibly all, of X$^2$, X$^3$, Y$^2$ and Y$^3$ is an optionally substituted hydrocarbyl group. In such embodiments, it is preferred that at least one, and most preferably all, of X$^2$, X$^3$, Y$^2$ and Y$^3$ is an optionally substituted alkyl group. Particularly preferred examples are C$_1$ to C$_4$ alkyl groups, especially methyl or ethyl. Alternatively, at least one, and preferably all, of X$^2$, X$^3$, Y$^2$ and Y$^3$ are aryl and/or heterocyclic such as pyridyl, pyrimidinyl, or a pyridine or pyrimidine containing group.

In preferred embodiments, R$^1$ is —R$^3$—R$^5$≡Y$^1$, X$^1$ and Y$^1$ are groups CX$^2$X$^3$ and CY$^1$Y$^2$ respectively and the dotted lines represent an absence of a bond. In these embodiments, the polymerisation may proceed by a cyclopolymerisation reaction.

A preferred group of polymeric precursors are compounds of structure (II)

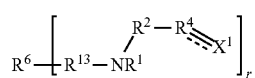

and in particular compounds of formula (III)

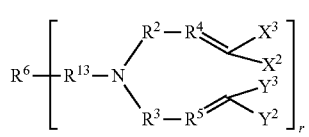

where r is an integer of 1 or more and R$^6$ is one or more of a binding group, an optionally substituted hydrocarbyl group, a perhaloalkyl group, a siloxane group, an amide, or a partially polymerised chain containing repeat units Where in the compounds of formulae (II) and (III), r is 1, compounds can be readily polymerised to form a variety of polymer types depending upon the nature of the group R$^6$. Embodiments in which r is 1 or 2 are most preferred.

Where in the compounds of formula (II), r is greater than one, polymerisation can result in polymer networks. On polymerisation of these compounds, networks are formed whose properties maybe selected depending upon the precise nature of the R$^6$ group, the amount of chain terminator present and the polymerisation conditions employed. Some examples of bridging groups can be found in WO 00/06610.

Preferably, r is 1, 2, 3 or 4.

Preferably, R$^6$ comprises a straight or branched chain hydrocarbyl group, optionally substituted or interposed with functional groups. Advantageously, the straight or branched chain hydrocarbyl is interposed or substituted with one or more of an amine moiety, C(O) or COOH.

In some embodiments, the polymeric precursor is a monomer in which R$^6$ is a straight or branched chain hydrocarbyl interposed with an amine moiety, or a pre-polymer obtained by pre-polymerisation of said monomer. Polymeric precursors of this type can be highly advantageous in promoting the adhesion of textile fibres to elastomeric materials. Preferably, the monomer is a straight or branched chain alkyl group having 1 to 30 carbon atoms, optionally interposed with a cyclic group. In particular in preferred embodiments, the monomer is a compound of formula (IV)

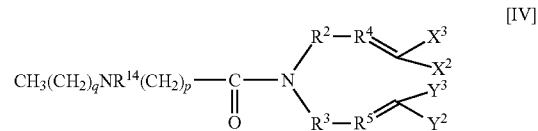

where R$^{14}$ is H or C$_s$H$_{2s+1}$, p is 1 to 10, 9 is 0 to 10 and s is 1 to 10.

In other preferred embodiments, the monomer is a compound of formula (V)

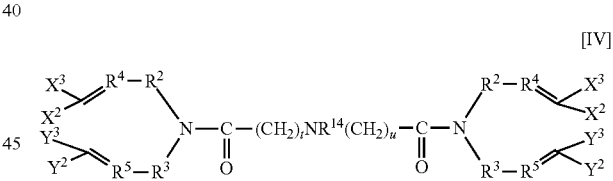

where t and u are independently 1 to 10 and R$^{14}$ is H or C$_s$H$_{2s+1}$, where s is 1 to 10.

In other preferred embodiments, the polymeric precursor is a monomer in which R$^6$ is a straight or branched chain hydrocarbyl substituted with a COOH end group, or a pre-polymer obtained by pre-polymerisation of said monomer. The monomer may be a straight or branched chain alkyl group having 1 to 30 carbon atoms, optionally interposed with a cyclic group. Advantageously, the monomer is a compound of formula (VI)

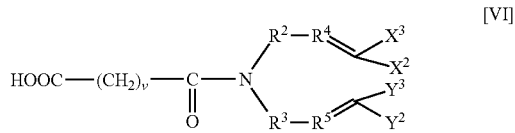

where v is 1 to 20.

In alternative embodiments, the polymeric precursor is a monomer in which $R^6$ is a straight or branched chain alkyl group having 1 to 30 carbon atoms, or a pre-polymer obtained by pre-polymerisation of said monomer. Polymeric precursors of this type can be advantageous in promoting adhesion between textile fibres and elastomeric materials.

In other embodiments still, the polymeric precursor is a monomer in which $R^6$ is a partially or per-halogenated straight or branched chain alkyl group having 1 to 30 carbon atoms, or a pre-polymer obtained by pre-polymerisation of said monomer. Preferably, the alkyl group is per-halogenated. It is preferred that the alkyl group is fluorinated, most preferably per-fluorinated.

In other embodiments still, the polymeric precursor is a monomer in which $R^{13}$ is CO and $R^6$ terminates in one or more amine moieties forming a urea structure, or a pre-polymer obtained by pre-polymerisation of said monomer.

In yet further embodiments, the polymeric precursor is a monomer of structure (VII)

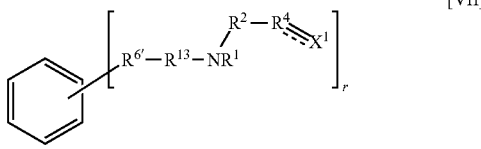

[VII]

where $R^{6'}$ is a straight or branched chained hydrocarbyl group, optionally substituted or interposed with functional groups, and r is an integer of two or more, or a pre-polymer obtained by a pre-polymerisation of said monomer. Preferably, r is two or three. Polymeric precursors of this type can be advantageously used to promote adhesion of textile fibres to elastomeric materials.

The step of polymerising the polymeric precursor may produce a homopolymer.

Alternatively, the step of polymerising the polymeric precursor may produce a copolymer, the polymeric precursor being mixed with one or more other polymeric precursor. The other polymeric precursor may be according to any of the formulae described herein. Alternatively, the co-monomer may be of a different class of compounds. The monomer may be copolymerised with a cross-linker. In these embodiments, the polymeric precursor may be reacted with a compound of formula VIII.

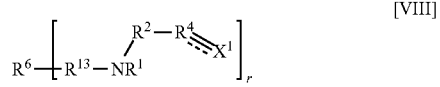

[VIII]

where $R^1$, $R^2$, $R^4$, $R^{13}$, and $X^1$ are as defined in relation to formula (I), r is an integer of 2 or more, and $R^6$ is a bridging group of valency r or a bond. Preferably, r is 2. The use of a compound of formula (VIII) is particularly advantageous when the polymeric precursor does not include the group

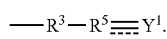

However, embodiments of polymeric precursors which include the group

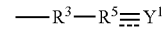

may also oe reamed with a compound of formula (VIII).

The cross-linker may be a compound of formula (IX)

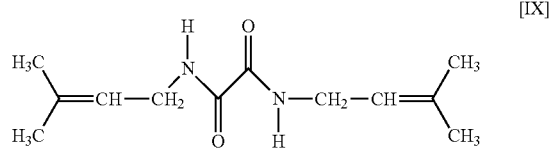 [SMILES: CC(C)=CCNC(=O)C(=O)NCC=C(C)C]

[IX]

Other examples of cross-linkers include N,N,N,N-Tetraallylethanediamide and 2,2',2",2'''-(ethane-1,2-diylbis(azanetriyl))tetrakis(N,N-diallylacetamide).

In preferred embodiments, the polymeric precursor is: N,N-diallylhexanamide, N,N-Diallyl-3-(propylamino)propanamide, benzene-1,3,5-tricarboxylic acid-tris-N,N-Diallylamide, or 2,2,3,3,4,4,5,5,6,6,7,7,8,8,8-pentadecafluoro-N,N-di(prop-2-en-1-yl)octanamide; or a co-monomer mixture including N,N-diallylhexanamide, N,N-Diallyl-3-(propylamino)propanamide, benzene-1,3,5-tricarboxylic acid-tris-N,N-Diallylamide, or 2,2,3,3,4,4,5,5,6,6,7,7,8,8,8-pentadecafluoro-N,N-di(prop-2-en-1-yl)octanamide. Alternatively, the polymeric precursor may be a pre-polymer obtained by a pre-polymerisation of any of these substances. Preferred co-monomer mixtures comprise: N,N-Diallyl-3-(propylamino)propanamide/N,N,N',N'-tetraallylethanediamide; N,N-diallylhexanamide/N,N,N',N'-tetraallylethanediamide; benzene-1,3,5-tricarboxylic acid-tris-N,N-Diallylamide/2,2',2",2'''-(ethane-1,2-diylbis(azanetriyl)) tetrakis(N,N-diallylacetamide); and N,N-Diallyl-3-(propylamino)propanamide/benzene-1,3,5-tricarboxylic acid-tris-N,N-Diallylamide/2,2,3,3,4,4,5,5,6,6,7,7,8,8,8-pentadecafluoro-N,N-di(prop-2-en-1-yl)octanamide.

The monomer or co-monomers may be pre-polymerised to produce a polymeric precursor. Typically, a thermal initiator is used and pre-polymerisation is performed at an elevated temperature above ambient temperature.

Typically, the first and second polymeric layers are adhered to the polymeric coatings under conditions of elevated temperature and/or pressure. Advantageously, when the first and second elastomeric layers are formed from a vulcanizable rubber, the first and second elastomeric layers are adhered to the polymeric coatings under vulcanization conditions of elevated temperature and/or pressure.

In accordance with the invention, a composite structure can be formed having a textile bonded to a polymeric material. The textile fibres may be adhered to a hosing or belt formed from the polymeric material. Reinforced rubber pressure hosing can be produced. Other applications include the manufacture of tyres and air cushions.

Whilst the invention has been described above, it extends to any inventive combination or sub-combination of the features set out above or in the following description or claims. For example, elements of the first aspect of the invention may be combined with elements of the second aspect of the invention.

Composite articles and methods in accordance with the invention will now be described with reference to the single accompanying FIGURE which shows (a) a plan view
(b) a cross sectional view
(c) a cutaway side view of a car hose of the invention.

The Figure shows an example of a composite article which may be produced in accordance with the invention, which in this example is a hose 10 for a car. The car hose 10 comprises a main tubular section 12 having suitable connections 14, 16 disposed at either end in a manner which is well known to the skilled reader. The tubular section is of a three-ply structure which is produced in accordance with the invention. As shown best effect in FIGS. 1(b) and (c), the tubular section 12 comprises an inner rubber layer 12a, an outer rubber layer 12b and a reinforcing textile layer 12c which is disposed intermediate the inner and outer rubber layers 12a, 12b. The textile layer 12c has polymeric coatings of the type described herein on both of its inner and outer faces. These polymeric coatings promote adhesion of the textile layer 12c to the inner and outer rubber layers 12a, 12b. The invention can be used to produce hoses and other composite articles formed from many combinations of rubbers and textiles. For example, the inner rubber layer 12a may be formed from an oil resistant rubber such as a fluoro-silicone rubber (FSR/FVMQ), and the outer rubber layer 12b may be formed from a suitable material such as silicone rubber (VMQ/HCR). Although the invention is not limited in this regard, it is advantageous that the textile layer may be an aramid fabric such as Nomex®. Examples of suitable polymeric coatings in accordance with the invention will now be described.

Unless otherwise stated, all percentages described below are wt %.

EXAMPLE 1

Adhesion promotion of m-aramid to silicone and fluoroelastomer using
N,N-Diallyl-3-(propylamino)propanamide and
N,N,N,N-Tetraallylethanediamide To a mixture of N,N-Diallyl-3-(propylamino)propanamide and N,N,N,N-Tetraallylethanediamide (in the ratio of 9:1 by weight) a thermal initiator was added (Vazo 67, DuPont, 5% weight of total monomer mixture) and stirred until fully dissolved. The mixture was then maintained at 70° C. for 8 hours with constant stirring to produce a viscous yellow oil, to which a photoinitiator was added (Ciba Irgacure 819, 2% by weight) and mixed thoroughly.

This formulation was then applied onto each side of a strip of m-aramid cloth (DuPont Nomex) at a coating weight of approximately 5 grams per square meter. The coating was cured sequentially after each layer was deposited using focused 200 W/cm UV source with an iron doped mercury bulb.

Strips of fluoro-elastomer and silicone compounds containing initiators or other curing agents were placed on each side of the adhesion promoted textile and then treated at 190° C. at 65-80 psi for 15 minutes to cure fluoro-elastomer and silicone rubber and bond them to the textile.

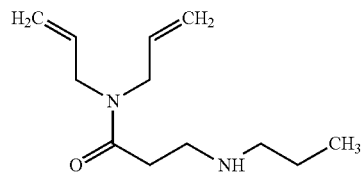

N,N-Diallyl-3-(propylamino)propanamide

Synthesis of
N,N-Diallyl-3-(propylamino)propanamide 3-bromopropionylchloride in dichloromethane (1:1 v/v) was added drop wise to a slight molar excess of diallylamine in dichloromethane (DCM) at ~10° C. over 2 hours with constant stirring. This was then washed in dilute HCl and dichloromethane and the organic fraction retained. The solution of product in DCM was then purified by column chromatography using silica (60 A) and the DCM removed to yield the 3-bromo-N,N-diallylpropylamide intermediate; a yellow liquid. Yield 70%.

The 3-bromo-N,N-diallylpropylamide intermediate (30 g, 129 mmoles) was added to THF (1:1 v/v). This was then added dropwise over 2 hours into a stirred, refluxing mixture of 1-propylamine (43.1 g, 0.730 mmoles), potassium carbonate (90 g, 0.652 mmoles) and THF (133.6 g, 1.850 mmoles). The reflux was then left to cool over 1 hour with constant stirring.

The cooled reaction mixture was washed in water (400 ml), dissolving the potassium carbonate and leaving a clear, yellow organic top layer, which was decanted off. This layer was then washed again in water, separated and dried to yield a yellow liquid N,N-Diallyl-3-(propylamino)propanamide product. Yield ~65%.

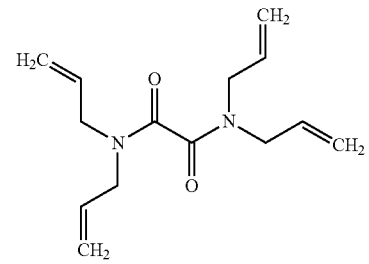 [SMILES: C=CCN(CC=C)C(=O)C(=O)N(CC=C)CC=C]

N,N,N,N-Tetraallylethanediamide

Synthesis of N,N,N,N-Tetraallylethanediamide

Fresh, dry oxaloyl chloride (ClOOCCOOCl) (200 mmoles) was placed into a 3-necked round bottomed (RB) flask with 200 ml of dry dichloromethane. Freshly distilled diallylamine (400 mmoles) was added to triethylamine (400 mmoles), further diluted (1:1 v/v) in dry dichloromethane then added into a dropping funnel and placed onto the reaction flask. Nitrogen gas was pumped through the vessel through the other two necks. To neutralise HCl produced, the waste gas was bubbled through a $CaCO_3$ solution. The reaction vessel was then placed into a salt water/ice bath and once the contents were cooled the diallylamine/triethylamine/DCM was added dropwise to the acid chloride solution with continual magnetic stirring of the mixture. The temperature was monitored and maintained between 5-10° C. The dropping of the diallylamine and triethylamine was stopped after three hours and the reaction was left to stir for another hour.

Thin layer chromatography using ethyl acetate and an alumina was used to monitor the reaction comparing starting material to the product. Iodine was used to develop the plate and the reaction product could be seen as a spot that had been eluted much further than the starting material.

To remove the amine chloride and excess diallylamine the reaction liquor was washed in 3M HCl. The monomer stayed in the DCM fraction and was removed using a separating funnel. Two washes of 100 ml HCl were used. The solvent was then removed in a rotary evaporator.

The product was added to dichloromethane (1:1 v/v) and passed through a silica gel (Merck, grade 60 for chromatography) column with dichloromethane as the eluent.

EXAMPLE 2

Adhesion promotion of m-aramid to EPDM rubber using N,N-Diallyl-3-(propylamino)propanamide and N,N,N',N'-Tetraallylethanediamide The same formulation coating method as used in example 1 was used with a woven m-aramid fabric but instead placed between two sheets of EPDM rubber compound. The m-aramid fabric was bonded to the EPDM under elevated pressure (45-75 psi) and temperature (190° C.) for 15 minutes.

EXAMPLE 3

Adhesion promotion of m-aramid to silicone rubber and fluoroelastomer using benzene-1,3,5-tricarboxylic acid-tris-N,N-Diallylamide and 2,2',2'',2'''-(ethane-1,2-diylbis(azanetriyl))tetrakis(N,N-diallylacetamide)

A mixture of benzene-1,3,5-tricarboxylic acid-tris-N,N-Diallylamide and 2,2',2'',2'''-(ethane-1,2-diylbis(azanetriyl))tetrakis(N,N-diallylacetamide) was made in a 9:1 ratio by weight, respectively. Photoinitiator (Ciba Irgacure 127) was added at 3% of total weight of monomer mixture and dissolved by maintaining gentle heating of the mixture. This formulation was then applied onto each side of a strip of m-aramid cloth (DuPont Nomex) at a coating weight of approximately 10 grams per square meter and the coating was cured sequentially after each layer was deposited using focused 200 W/cm UV source with an iron doped mercury bulb.

Strips of fluoro-elastomer and silicone compounds containing initiators or other curing agents were placed on each side of the adhesion promoted textile and then treated at approximately 175° C. in a 40 tonne upstroking press for 25 minutes to cure the fluoro-elastomer and silicone rubber and bond them to the textile.

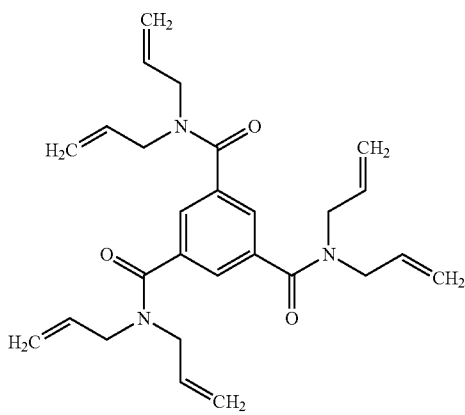 [SMILES: C=CCN(CC=C)C(=O)c1cc(C(=O)N(CC=C)CC=C)cc(C(=O)N(CC=C)CC=C)c1]

benzene-1,3,5-tricarboxylic
acid-tris-N,N-Diallylamide

Synthesis of Benzene-1,2,4-tricarboxylic acid-tris-N,N-Diallylamide

A mixture of N,N-Diallylamine (128.26 g, 1.32 moles) and dichloromethane (106.0 g, 1.248 moles) was added to a funnel and added dropwise over 75 minutes to a reaction vessel containing a cooled mixture (10° C.) of 1,3,5-trimesoyl chloride (53.1 g, 0.200 moles) in dichloromethane (530.0 g, 6.24 moles) with constant stirring. The temperature was maintained at <10° C. for the duration of the addition of the diallylamine solution and then left to return to room temperature over another 60 minutes with constant stirring. The organic reaction product was then washed with an excess of water (1×600 ml and 2×300 ml) to remove the hydrochloride salt of the diallylamine, followed by drying over MgSO$_4$. Solids were then filtered off and the solvent removed under vacuum. The crude product was then purified by column chromatography using a silica column and dichloromethane as eluent. The dichloromethane was again removed under vacuum to yield a pale yellow, viscous product. Yield 60.2%.

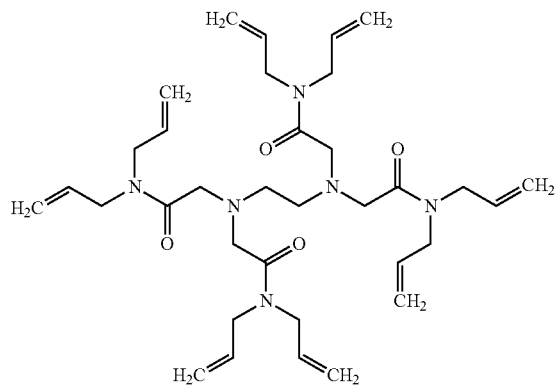 [SMILES: C=CCN(CC=C)C(=O)CN(CCN(CC(=O)N(CC=C)CC=C)CC(=O)N(CC=C)CC=C)CC(=O)N(CC=C)CC=C]

2,2',2'',2'''-(ethane-1,2-diylbis(azanetriyl))tetrakis(N,N-diallylacetamide

Synthesis of 2,2',2'',2'''-(ethane-1,2-diylbis(azanetriyl))tetrakis(N,N-diallylacetamide)

A mixture of 4-dimethylamino pyridine (0.5 g), dicyclohexylcarbodiimide (103.0 g), ethylenediamine tetraacetic acid (36.0 g), diallylamine (53.0 g) and dichloromethane (250 g) was added to a reaction vessel and maintained at approximately 20° C. for 120 hours with constant stirring. Solids, including urea formed in the reaction, were then removed by filtration followed by the removal of amine and solvent under vacuum. After removal of impurities a clear, viscous oil was obtained (~65%).

EXAMPLE 4

Adhesion promotion of a poly(ester) textile to silicone rubber and fluoroelastomer using N,N-diallyl hexanamide and N,N,N',N'-Tetraallylethanediamide To a mixture of N,N-diallyl hexanamide and N,N,N',N'-Tetraallylethanediamide in the ratio of 9:1 by weight a thermal initiator (Vazo 67, DuPont) was added initially at 1% weight of total mixture and increased by 1% after each hour of reaction until 5% was added with a total reaction time of 8 hours; reaction temperature was maintained at 70° C. over the whole reaction period. A viscous yellow oil was produced. To this a photoinitiator (Ciba Irgacure 819) was added at 2% by weight of total solution and mixed thoroughly. This formulation was then applied onto each side of a strip of knitted poly(ester) fabric at a coating weight of approximately 5 grams per square meter with UV curing performed sequentially after each layer was deposited.

Strips of fluoro-elastomer and silicone compound were placed on each side of a knitted poly(ester) fabric coated with the adhesion promoting layer and then treated at 190° C. at 45-75 psi for 25 minutes to cure fluoro-elastomer and silicone rubber and bond them to the textile.

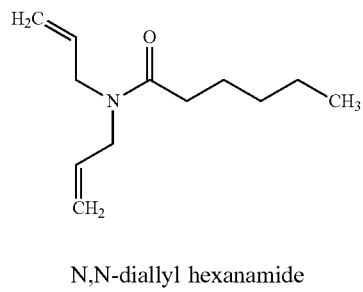

N,N-diallyl hexanamide

Synthesis of N,N-diallylhexanamide

A mixture of diallylamine (>99%, 70.85 g), dichloromethane (265.0 g) and triethylamine (>98%, 73.4 g)) was added dropwise to a stirred mixture of hexanoyl chloride (>98%, 96.15 g) and dichloromethane (530.0 g) over 195 minutes with temperature maintained between 0-10° C. Following this the reaction vessel was allowed to warm to room temperature with stirring of the mixture maintained for a further 60 minutes. The resulting reaction liquor was washed in HCl (3M, 600 ml) and the organic phase separated and dried over anhydrous $MgSO_4$. After filtration, volatiles including the dichloromethane, were removed under vacuum and the crude product further purified by column chromatography using silica and ethyl acetate as eluent. Ethyl acetate was removed from the product under vacuum to yield a yellow oil, yield 64%.

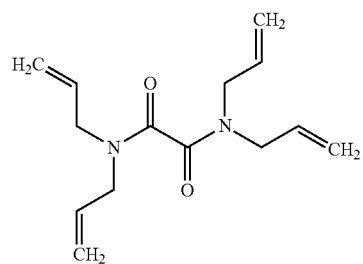 [SMILES: C=CCN(CC=C)C(=O)C(=O)N(CC=C)CC=C]

N,N,N',N'-Tetraallylethanediamide

EXAMPLE 5

Adhesion promotion of a poly(aramid) textile to silicone rubber and fluoroelastomer using a mixture of N,N-Diallyl-3-(propylamino)propanamide, benzene-1,3,5-tricarboxylic acid-tris-N,N-Diallylamide and the fluorinated monomer, 2,2,3,3,4,4,5,5,6,6,7,7,8,8,8-pentadecafluoro-N,N-di(prop-2-en-1-yl)octanamide A mixture of N,N-Diallyl-3-(propylamino)propanamide (85.5wt %), benzene-1,3,5-tricarboxylic acid-tris-N,N-Diallylamide (9.5 wt %), 2,2,3,3,4,4,5,5,6,6,7,7,8,8,8-pentadecafluoro-N,N-di(prop-2-en-1-yl)octanamide (2 wt %) and the photoinitiator Irgacure 127 (3 wt%, Ciba SC) was applied onto each side of a strip of m-aramid cloth (DuPont Nomex) at a coating weight of approximately 10 grams per square meter. The coating was cured sequentially after each layer was deposited using focused 200 W/cm UV source with an iron doped mercury bulb.

Strips of fluoro-elastomer and silicone compounds containing initiators or other curing agents were placed on each side of the adhesion promoted textile and then treated at approximately 175° C. in a 40 tonne up-stroking press for 25 minutes to cure the fluoro-elastomer and silicone rubber and bond them to the textile.

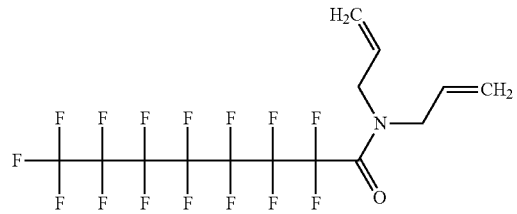 [SMILES: C=CCN(CC=C)C(=O)C(F)(F)C(F)(F)C(F)(F)C(F)(F)C(F)(F)C(F)(F)C(F)(F)F]

2,2,3,3,4,4,5,5,6,6,7,7,8,8,8-pentadecafluoro-N,N-di(prop-2-en-1-yl)octanamide

Synthesis of 2,2,3,3,4,4,5,5,6,6,7,7,8,8,8-pentadecafluoro-N,N-di(prop-2-en-1-yl)octanamide A mixture of perfluorooctanoyl chloride (20.0 g) and dichloromethane (1.6 g) was added drop-wise over 1 hour to a stirring mixture of diallylamine (9.88 g, >99%) and dichloromethane (1.72 g), cooled to 0° C. The reaction was allowed to warm to room temperature with continuous stirring for a further hour.

The product was washed with water (500 ml) twice, followed by the removal of the dichloromethane under vacuum to yield a very low viscosity orange-yellow liquid (yield 79%).

EXAMPLE 6

Synthesis of 1,1-Diallyl-3-(6-{3,5-bis-[6-(3,3-diallylureido)-hexyl]-2,4,6-trioxo-[1,3,5]-triazinan-1-yl-hexyl)urea N,N-diallylamine (Freshly dried, 30.60 g) was added dropwise to a mixture of the isocyanate Tolonate HDT-LV2' (Rhodia) (50.4 g) in dichloromethane (>99.5%, 132.50 g) over 2 hours with the temperature maintained to below 30° C. and with constant stirring. After the addition of the diallylamine the mixture was maintained for a further 30 minutes at room temperature. Solvent and excess diallylamine were removed under vacuum to yield a high viscosity, amber liquid with a yield of 80.1%. This monomer can be used to adhere a textile layer to elastomers such as NBR rubber and FKM fluoroelastomers using the principles described herein.

1,1-Diallyl-3-(6-{3,5-bis-[6-(3,3-diallyl-ureido)-hexyl]-2,4,6-trioxo-[1,3,5]-triazinan-1-yl-hexyl)urea the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents,

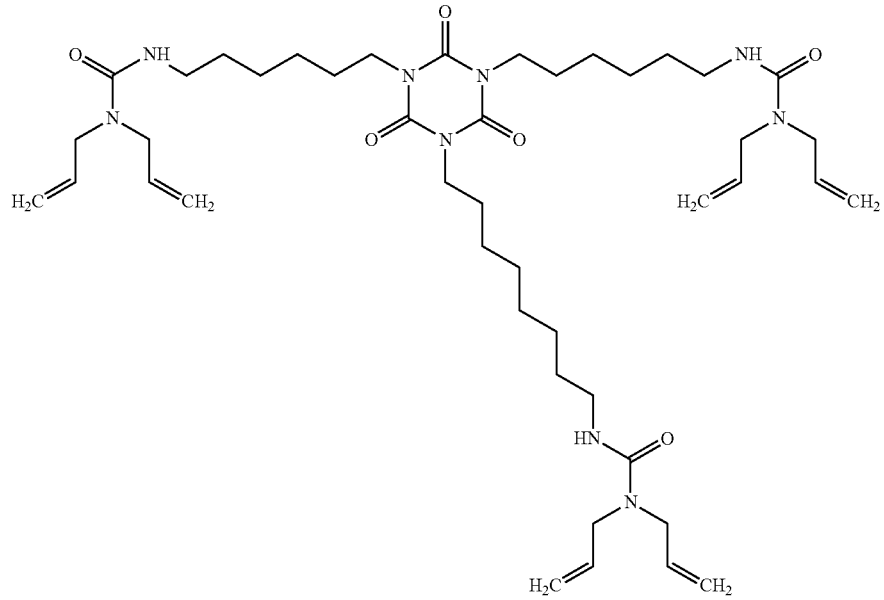 [SMILES: C=CCN(CC=C)C(=O)NCCCCCCCCn1c(=O)n(CCCCCCNC(=O)N(CC=C)CC=C)c(=O)n(CCCCCCNC(=O)N(CC=C)CC=C)c1=O]

The invention claimed is:

1. A composite article including:
   a textile layer having a first and a second face, each of the first and second faces having a polymeric coating thereon;
   a first elastomeric polymeric layer adhered to the polymeric coating on the first face of the textile layer; and
   a second elastomeric polymeric layer adhered to the polymeric coating on the second face of the textile layer;
   in which the polymeric coatings on the first and second faces of the textile layer are each formed by polymerising a polymeric precursor which includes a group of sub-formula (I)

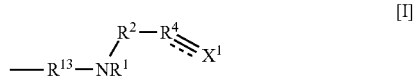 [I]

where $R^2$ and $R^3$ are independently selected from $(CR^7R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where $R^1$ is selected from hydrogen, halo, nitro, hydrocarbyl, optionally substituted or interposed with functional groups, or

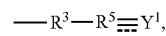

and
$R^{13}$ is C(O) or $S(O)_2$.

2. A composite article according to claim 1 in the form of a hose, in which the textile layer and the first and second elastomeric layers are cylindrical, and wherein the first elastomeric layer is external to the textile layer and the second elastomeric layer is internal to the textile layer.

3. A composite article according to claim 1 in the form of a belt, a tyre or an air cushion.

4. A composite article according to claim 3 in the form of an endless belt, preferably a conveyor belt or a power transmission belt.

5. A composite article according to claim 1 in which at least one of the first and second elastomeric layers is a rubber.

6. A composite article according to claim 1 in which the first elastomeric layer is formed from a different material to the second elastomeric layer.

7. A composite article according to claim 2 in the form of a hose, in which the first elastomeric layer is formed from a silicone rubber and the second elastomeric layer is formed from a fluoro-silicone rubber.

8. A composite article according to claim 1 in which the first and second polymeric layers are formed from a thermosetting polymer.

9. A composite article according to claim 8 in which thermosetting polymer is a thermosetting epoxy resin.

10. A composite article according to claim 1 in which the textile layer is formed at least partially from polymeric fibres.

11. A composite article according to claim 10 in which the textile layer contains aramid fibres.

12. A method of producing a composite article including the steps of:
providing a textile layer having a first and second face;
providing at least one polymeric precursor which includes a group of sub-Formula (I)

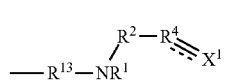
[I]

where $R^2$ and $R^3$ are independently selected from $(CR^7 R^8)_n$, or a group $CR^9R^{10}$, $CR^7R^8CR^9R^{10}$ or $CR^9R^{10}CR^7R^8$ where n is 0, 1 or 2, $R^7$ and $R^8$ are independently selected from hydrogen, halo or hydrocarbyl, and either one of $R^9$ or $R^{10}$ is hydrogen and the other is an electron withdrawing group, or $R^9$ and $R^{10}$ together form an electron withdrawing group, and $R^4$ and $R^5$ are independently selected from CH or $CR^{11}$ where $R^{11}$ is an electron withdrawing group, the dotted lines indicate the presence or absence of a bond, $X^1$ is a group $CX^2X^3$ where the dotted line bond to which it is attached is absent and a group $CX^2$ where the dotted line bond to which it is attached is present, $Y^1$ is a group $CY^2Y^3$ where the dotted line bond to which it is attached is absent and a group $CY^2$ where the dotted line bond to which it is attached is present, and $X^2$, $X^3$, $Y^2$ and $Y^3$ are independently selected from hydrogen, fluorine or other substituents, $R^1$ is selected from hydrogen, halo, nitro, hydrocarbyl, optionally substituted or interposed with functional groups, or

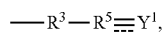

and $R^{13}$ is C(O) or $S(O)_2$;
polymerising the polymeric precursor or precursors to form a polymeric coating on each of the first and second faces of the textile layer;
adhering a first elastomeric polymeric layer to the polymeric coating on the first face of the textile layer; and
adhering a second elastomeric polymeric layer to the polymeric coating on the second face of the textile layer.

13. A method according to claim 12 in which the polymeric precursor is a compound of structure (II)

[II]

where r is an integer of 1 or more and $R^6$ is one or more of a bridging group, an optionally substituted hydrocarbyl group, a perhaloalkyl group, a siloxane group, an amide, or a partially polymerised chain containing repeat units.

14. A method according to claim 13 in which the polymeric precursor is a compound of structure [III]

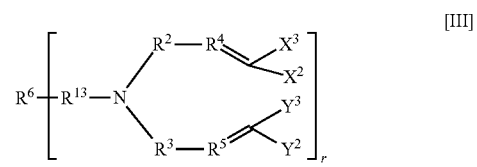
[III]

15. A method according to claim 13 in which $R^6$ comprises a straight or branched chain hydrocarbyl group, optionally substituted or interposed with functional groups.

16. A method according to claim 15 in which the straight or branched chain is interposed or substituted with one or more of an amine moiety, C(O) or COOH.

17. A method according to claim 16 in which the polymeric precursor is a monomer in which $R^6$ is a straight or branched chain hydrocarbyl interposed with an amine moiety, or a pre-polymer obtained by pre-polymerisation of said monomer.

18. A method according to claim 16 in which the polymeric precursor is a monomer in which $R^6$ is a straight or branched chain hydrocarbyl substituted with a COOH end group, or a pre-polymer obtained by pre-polymerisation of said monomer.

19. A method according to claim 15 in which the polymeric precursor is a monomer in which $R^6$ is a straight or branched chain alkyl group having 1 to 30 carbon atoms, or a pre-polymer obtained by pre-polymerisation by said monomer.

20. A method according to claim 15 in which the polymeric precursor is a monomer in which $R^6$ is a partially or per-halogenated straight or branched chain alkyl group having 1 to 30 carbon atoms, or a pre-polymer by pre-polymerisation of said monomer.

21. A method according to claim 17 in which the polymeric precursor is a monomer in which $R^{13}$ is CO and $R^6$ terminates in one or more amine moieties thereby forming a urea structure, or a pre-polymer obtained by pre-polymerisation of said monomer.

22. A method according to claim 12 in which the first and second faces of the textile layer are coated with the polymeric precursor or precursors prior to the step of polymerising the polymeric precursor or precursors.

23. A method according to claim 12 in which the polymeric precursor or precursors are polymerised by exposure to UV radiation.

* * * * *